United States Patent
Horimoto et al.

(10) Patent No.: US 9,410,232 B2
(45) Date of Patent: Aug. 9, 2016

(54) METHOD FOR PRODUCING STEEL COMPONENT

(71) Applicants: NIPPON STEEL & SUMITOMO METAL CORPORATION, Tokyo (JP); HONDA MOTOR CO., LTD., Tokyo (JP)

(72) Inventors: Masayuki Horimoto, Tokyo (JP); Hideki Imataka, Tokyo (JP); Masaomi Nakaoka, Tokyo (JP); Akihito Ninomiya, Saitama (JP); Yoshinari Okada, Saitama (JP)

(73) Assignees: NIPPON STEEL & SUMITOMO METAL CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 282 days.

(21) Appl. No.: 14/352,829

(22) PCT Filed: Oct. 31, 2012

(86) PCT No.: PCT/JP2012/078125
§ 371 (c)(1),
(2) Date: Apr. 18, 2014

(87) PCT Pub. No.: WO2013/065718
PCT Pub. Date: May 10, 2013

(65) Prior Publication Data
US 2014/0246126 A1 Sep. 4, 2014

(30) Foreign Application Priority Data
Nov. 1, 2011 (JP) ................................. 2011-240003

(51) Int. Cl.
| | | |
|---|---|---|
| *C23C 8/22* | (2006.01) | |
| *C23C 8/32* | (2006.01) | |
| *C23C 8/80* | (2006.01) | |
| *C21D 9/28* | (2006.01) | |
| *C21D 9/32* | (2006.01) | |
| *C21D 1/06* | (2006.01) | |
| *C21D 1/58* | (2006.01) | |
| *C22C 38/00* | (2006.01) | |
| *C22C 38/22* | (2006.01) | |
| *C22C 38/26* | (2006.01) | |
| *C21D 9/30* | (2006.01) | |
| *C22C 38/02* | (2006.01) | |
| *C22C 38/04* | (2006.01) | |
| *C22C 38/06* | (2006.01) | |
| *F16H 55/34* | (2006.01) | |
| *F16H 55/06* | (2006.01) | |

(52) U.S. Cl.
CPC ... *C23C 8/80* (2013.01); *C21D 1/06* (2013.01); *C21D 1/58* (2013.01); *C21D 9/28* (2013.01); *C21D 9/30* (2013.01); *C21D 9/32* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/26* (2013.01); *C23C 8/22* (2013.01); *C23C 8/32* (2013.01); *F16H 55/34* (2013.01); *F16H 55/06* (2013.01)

(58) Field of Classification Search
CPC ..................................... C23C 8/32; C23C 8/22
See application file for complete search history.

(56) References Cited

FOREIGN PATENT DOCUMENTS

| | | |
|---|---|---|
| JP | 60-21359 | 2/1985 |
| JP | 64-31927 | 2/1989 |
| JP | 4-297552 | 10/1992 |
| JP | 6-271983 | 9/1994 |
| JP | 6-306572 | 11/1994 |
| JP | 7-126803 | 5/1995 |
| JP | 7-242994 | 9/1995 |
| JP | 10-158677 | 6/1998 |
| JP | 2005-344167 | 12/2005 |
| JP | 2010-222634 | 10/2010 |
| WO | 02/090602 | 11/2002 |
| WO | 2008/004548 | 1/2008 |
| WO | 2011/114836 | 9/2011 |

*Primary Examiner* — Jessee Roe
(74) *Attorney, Agent, or Firm* — Clark & Brody

(57) ABSTRACT

A method for producing a steel component by performing the treatments of the following sequentially steps 1 and 2 to a steel material containing, by mass %, C: 0.15 to 0.25%, Si: 0.01 to 0.10%, Mn: 0.50 to 0.80%, S: 0.003 to 0.030%, Cr: 0.80 to 1.20%, Mo: 0.30 to 0.45%, Al: 0.015 to 0.050%, and N: 0.010 to 0.025%, wherein Cr/Mn is 1.3 to 2.4, the balance being Fe and impurities, and contents of P and O among the impurities are P: not more than 0.010%, and O: not more than 0.0020%:

step 1: a treatment which holds the steel material at a temperature of 850 to 1000° C. in a carburizing atmosphere or carbonitriding atmosphere, and step 2: a treatment which quenches the carburized or carbonitrided steel material, by using quenching oil having a temperature of 40 to 80° C. and a kinetic viscosity of 20 to 25 mm²/s at 40° C.

3 Claims, 5 Drawing Sheets

METHOD FOR PRODUCING STEEL COMPONENT

TECHNICAL FIELD

The present invention relates to a method for producing a steel component. Particularly, the present invention relates to a method for producing a power transmitting component made of steel, which is excellent in machinability in cutting process, or in cold forgeability during net-shape forming, and is also excellent in high-cycle and low-cycle bending fatigue strengths and pitting resistant strength, after carburizing-quenching or carbonitriding-quenching.

BACKGROUND ART

Generally, a "case hardening treatment" such as induction quenching, carburizing-quenching, carbonitriding-quenching, and the like is applied to steel components of automobiles and industrial machinery, in particular, for gears, pulleys, shafts and the like made of steel which are used as power transmitting components.

Among those described above, the "induction quenching" is a quenching in which steel components are rapid heated into a high-temperature austenite region with a temperature of the $Ac_3$ points or higher, and thereafter cooled. The induction quenching has an advantage in that the adjustment of case depth is relatively easy. In order to obtain a necessary surface hardness, case depth, and core hardness, it is general to use, as the material to be treated, a medium carbon steel such as S45C specified in JIS G 4051 (2009) and SCr440 specified in JIS G 4053 (2008).

However, since a medium carbon steel has a higher material hardness than that of a low carbon steel, it is worse in machinability in cutting process as well as in cold forgeability during net-shape forming. In addition, in the case of induction quenching, a problem exists in that an induction heating coil needs to be made for each component.

For that reason, the carburizing-quenching or carbonitriding quenching has become more frequently used for the case hardening treatment of the steel components mentioned above.

When the carburizing-quenching or carbonitriding quenching is used as the case hardening treatment, the steel components mentioned above are produced, for example, by the following method.

(1) A rolled steel bar or wire rod made of steel for machine structure is prepared. As the steel for machine structure, a steel which has a lower C content than that of a steel used for induction quenching, such as SCr420, SCM420, and SNCM420 etc. specified in JIS G 4053 (2008), is used.

(2) The prepared rolled steel bar or wire rod is hot forged to be roughly formed into an intermediate product.

(3) The roughly formed intermediate product of (2) described above is subjected to cutting after being subjected to normalizing treatment as needed.

(3') The roughly formed intermediate produce of (2) described above is subjected to net-shape forming by cold forging after being subjected to normalizing treatment as needed.

(4) The intermediate product which has been subjected to cutting or net-shape forming is subjected to carburizing-quenching or carbonitriding-quenching as the case hardening treatment and further to tempering at a temperature not more than 200° C. as needed, to obtain the steel components described above.

(5) Shotpeening and/or surface grinding may be further performed after the case hardening or after the tempering of (4) described above to obtain the steel components.

In recent years, to improve the fuel economy of automobiles and industrial machines, or to realize higher output power of engines, reduction in weight and size of steel components has been promoted. However, as a result of such reduction in weight and size, load applied to the steel components tends to increase. For that reason, improvements in the bending fatigue strengths in a high-cycle region, as well as improvements in bending fatigue strength in a low-cycle region and pitting resistant strength is demanded for the steel components.

To be specific, for example, in the case of a gear for automobiles, at a gear tooth root, higher bending fatigue strength in a high-cycle region of a number of load repetitions of about $1.0 \times 10^7$ is demanded in respect of suppressing a tooth root breakage, and also higher bending fatigue strength in a low-cycle region of a number of load repetitions of about $1.0 \times 10^5$ is demanded in respect of suppressing a tooth root breakage at a large load applied at the start of driving. Further, at a tooth face, higher pitting resistant strength is demanded in respect of suppressing noises during meshing of gears and suppressing a breakage of tooth starting at a portion of exfoliation.

Hereafter, the bending fatigue strength in a high-cycle region as described above is referred to as "high-cycle bending fatigue strength", and the bending fatigue strength in a low-cycle region is referred to as "low-cycle bending fatigue strength".

To meet such demands, a technique of performing a case hardening treatment by carburizing-quenching or carbonitriding-quenching using a steel containing a large amount of alloying elements compared with the steel for machine structure specified in JIS G 4053 (2008) described above, and a technique of further performing shotpeening after case hardening treatment have been proposed.

Patent Document 1 (JP6-306572A) discloses a "gear" made of a material which contains elements such as Si: not more than 0.1%, Ni: 0.4 to 0.6%, Mo: 0.6 to 1.0%, and Nb: 0.02 to 0.5% with the balance being Fe, and has a carburized abnormal layer of not more than 6 µm and a grain size of No. 9 or larger.

Patent Document 2 (JP64-31927A) discloses a "method for producing a heat treated steel component" in which a steel consisting of C: 0.10 to 0.40%, Si: not less than 0.06% and less than 0.15%, Mn: 0.30% to 1.00%, Cr: 0.90% to 1.20%, Mo: more than 0.30% and not more than 0.50%, the balance being Fe, is subjected to carburizing-quenching or carbonitriding-quenching, and subsequently to shotpeening.

Patent Document 3 (JP60-21359A) discloses a "steel for gear to be used with carburizing treatment" which contains elements such as Cr: 0.40 to 1.50% and Si: not more than 0.10% and further contains, as needed, one or more kinds of Ni: not more than 2.50%, Mo: not more than 0.40%, and Nb: 0.005 to 0.025%, with the balance being substantially Fe.

Patent Document 4 (JP7-242994A) discloses a "steel for gear having excellent tooth face strength" which contains elements such as Si: not more than 1.0% and Cr: 1.50 to 5.0% with the balance being Fe and impurities, and a "method for producing a gear having excellent tooth face strength" in which a case hardening treatment by carburizing-quenching and tempering or carbonitriding-quenching and tempering is performed using the aforementioned steel for gear, or shotpeening is further performed, as needed, after the case hardening treatment.

Patent Document 5 (JP7-126803A) discloses a "steel for carburized gear" which contains elements such as Si: 0.35 to 3.0%, Cr: 0.3 to 5.0%, and V: 0.05 to 0.5% and further contains, as needed, one or more kinds of Ni: not more than 3.0%, Mo: not more than 1.0%, and Nb: not more than 0.1%, with the balance being Fe and inevitable impurities.

LIST OF PRIOR ART DOCUMENT(S)

[Patent Document 1] JP6-306572A
[Patent Document 2] JP64-31927A
[Patent Document 3] JP60-21359A
[Patent Document 4] JP7-242994A
[Patent Document 5] JP7-126803A

DISCLOSURE OF THE INVENTION

Problems to be Solved by the Invention

In general, since the hardness of steel increases as the content of alloying elements increases, its machinability deteriorates and also its cold forgeability during net-shape forming deteriorates, accordingly. This is also the case with steels disclosed in Patent Documents 1 to 5 having a large content of alloying elements.

Therefore, when any of the steels proposed in Patent Documents 1 to 5 is used, it is necessary, in the production of a steel component, to add a process of softening heat treatment before cutting or net-shape forming to avoid the deterioration of machinability in cutting process, or the deterioration of cold forgeability during net-shape forming. This will cause an increase of process steps reducing the productivity as well as increasing the production cost of the component.

Further, in view of steep rises in the prices of alloying elements in recent years, there is growing demand for reducing the material cost particularly by decreasing the contents of Ni and Mo.

The technique proposed in Patent Document 1 requires that Ni: 0.4 to 0.6%, Mo: 0.6 to 1.0%, and Nb: 0.02 to 0.5% be contained as essential elements. For this reason, it cannot sufficiently meet the above mentioned demand for reducing the material cost.

In the technique proposed in Patent Document 2, shotpeening is performed at an appropriate condition. As a result of this, the technique is able to achieve improvements in high-cycle bending fatigue strength as shown in Table 3 thereof. However, it lacks consideration of low-cycle bending fatigue. Therefore, the technique cannot meet the demand for improving low-cycle fatigue strength to cope with the reduction in weight and size of a steel component.

According to the technique proposed in Patent Documents 3 to 5, it is possible to achieve excellent bending fatigue strength and surface fatigue strength by carburizing-quenching or carbonitriding-quenching. However, it is difficult, as described above, to avoid deterioration of machinability or deterioration of cold forgeability during net-shape forming. That is, it is not possible to combine those mutually contradictory properties: bending and surface fatigue strengths, and the machinability or cold forgeability, at a high level.

The present invention has been made in view of the above described circumstances and its object is to provide a method for producing a steel component, particularly a method for producing a power transmitting component made of steel such as a gear, a pulley, and a shaft, wherein the method can reduce the contents of expensive alloying elements to suppress the material cost, while allowing the steel component to have excellent high-cycle bending fatigue strength, low-cycle bending fatigue strength, and pitting resistant strength, and the method can ensure a sufficient machinability in the cutting process or a sufficient cold forgeability in the net-shape forming process when producing the component, and further can suppress the variation of heat treatment distortion at the time of carburizing-quenching or carbonitriding-quenching.

Means for Solving the Problems

The present inventors have continued investigations and research to solve the above described problems. As a result, they have obtained the following findings (a) to (n).

(a) To ensure excellent machinability during cutting or excellent cold forgeability during net-shape forming, it is necessary that the microstructure before cutting or net-shape forming, that is, the microstructure after hot forging, or the microstructure after normalizing when the normalizing treatment is performed after hot forging, is a stable mixed structure of ferrite and pearlite. When the microstructure is mixed with bainite, the hardness of the microstructure increases and thereby cutting resistance increases, resulting in deterioration of machinability, and also the deformation resistance increases, resulting in deterioration of cold forgeability.

(b) As a result of a crack being initiated from the outer layer of the component, the low-cycle bending fatigue strength deteriorates. For that reason, to increase the low-cycle bending fatigue strength, it is important to perform two things; one is to suppress distortion which initiates a crack during loading, and the other is to increase critical strength at which a crack is initiated in the outer layer of the component (hereafter, referred to as "crack-initiation strength"). To suppress distortion to initiate a crack during loading, it is effective to increase the core hardness of the component (the hardness of the base metal of the component).

(c) To increase the core hardness of the component, it is effective to increase the contents of Mo and/or Ni. However, when the contents of those elements are too high, since bainite is likely to be mixed in the microstructure after hot forging, or the microstructure after normalizing when normalizing treatment is performed after hot forging, the machinability and the cold forgeability deteriorate. For that reason, it is difficult to combine the low-cycle bending fatigue strength and the machinability or the cold forgeability at a high level. That is, it is important to increase the core hardness by other means.

(d) To increase the crack-initiation strength in the outer layer of the component, first it is important to reduce intergranular oxidation depth. To this end, although reducing the Si content is effective, that is not sufficient and the ratio of the contents of Cr and Mn, that is, the range of "Cr/Mn" needs to be controlled.

(e) To increase the crack-initiation strength in the outer layer of the component, it is also necessary to reduce impurities present at grain boundaries. The "impurities present at grain boundaries" refer to, for example, P which segregates at grain boundaries, cementite formed at grain boundaries during carburizing-quenching or carbonitriding-quenching.

(f) The carburizing-quenching or carbonitriding-quenching is generally performed by using oil having a temperature of 100 to 150° C. However, when oil of the aforementioned temperature is used, the component may be subjected to self-tempering during quenching treatment so that film-like cementite is produced at grain boundaries. Since the presence of such film-like cementite causes deterioration of grain boundary strength, the low-cycle bending fatigue strength of the component will not be improved. Furthermore, if the steel having been subjected to self-tempering is tempered at a temperature of about 200° C., since P becomes likely to segregate at interface between cementite and grain boundary, further deteriorating the grain boundary strength, the low-cycle bending fatigue strength of the steel will not be improved. That is, to increase the low-cycle bending fatigue strength, it is important that the steel is rapidly cooled so as not to be subjected to self-tempering during carburizing-quenching or carbonitriding-quenching. If the steel is allowed to rapidly cool during carburizing-quenching or carbonitriding-quenching, it is also possible to increase the core hardness even without increasing the contents of Mo and Ni so much.

(g) As in the case of the low-cycle bending fatigue strength, the high-cycle bending fatigue strength is improved by increasing the crack-initiation strength in the outer layer of the component. Therefore, to increase the high-cycle bending fatigue strength, it is necessary to reduce the intergranular oxidation depth. That is, in addition to reducing the Si content as described above, it is necessary to control the ratio of the contents of Cr and Mn, that is, the range of "Cr/Mn".

(h) It is also possible to improve the high-cycle bending fatigue strength by increasing the outer layer hardness of the component. Further, increasing the outer layer hardness of the component also leads to increasing pitting resistant strength.

(i) To increase the outer layer hardness of the component, it is preferable to reduce slack quenching structure in the vicinity of grain boundary oxides in the outer layer of the component, which are generated at the time of carburizing-quenching or carbonitriding-quenching.

(j) The slack quenching structure, which is generated in the vicinity of the grain boundary oxides in the outer layer portion of the component, is pearlite and/or bainite. It is when the steel is slowly cooled around 500 to 600° C. that pearlite is produced during cooling of carburizing-quenching or carbonitriding-quenching. For that reason, it is possible to suppress the production of pearlite by rapidly cooling the steel through the aforementioned temperature range.

(k) At the time of quenching, the component is cooled through each of the stages of "film boiling heat transfer", "nucleate boiling heat transfer", and "convection heat transfer". Among the aforementioned three stages, one having highest cooling power is the stage of "nucleate boiling heat transfer". For that reason, by making the stage of "nucleate boiling heat transfer" cover a wide temperature range, it is possible to increase the cooling rate of the outer layer portion of the component.

(l) To increase the temperature range of the stage of "nucleate boiling heat transfer", it is important to lower the starting temperature of the "convection heat transfer" stage, and to this end, it is necessary to lower the kinetic viscosity of the quenching oil. Since lowering the starting temperature of the "convection heat transfer" stage makes it possible to increase the cooling rate around the Ms point which is the temperature at which martensitic transformation starts, it is possible to suppress the production of bainite.

(m) Concerned issues when the kinetic viscosity of the quenching oil is changed are the amount of variation of heat treatment distortion caused by quenching. However, as an example is shown in an Example to be described below, even when quenching oil having a low kinetic viscosity and a low starting temperature of the "convection heat transfer" stage is used, the amount of variation of heat treatment distortion caused by quenching is about the same level as when conventional quenching oil which is to be used at a temperature of about 100 to 150° C. and which has a high kinetic viscosity is used. Further, when quenching oil which has a low kinetic viscosity and a low starting temperature of the "convection heat transfer" stage is used, even if Mo is not contained so much and Ni is not contained in the steel, it is possible to suppress the production of slack quenching structure in the vicinity of grain boundary oxides in the outer layer portion of the component.

(n) In addition to controlling the specific range of the content of each constituent element of the steel, by controlling the ratio of the contents of Cr and Mn as described in term (d), that is, the range of "Cr/Mn" to be in a specific range, it is possible to simultaneously achieve the following three items:

[1] suppressing the material cost,

[2] allowing the steel component to have excellent high-cycle bending fatigue strength, low-cycle bending fatigue strength, and pitting resistant strength, and

[3] ensuring sufficient machinability in the cutting process or sufficient cold forgeability in net-shape forming process, when producing the component.

The present invention has been completed based on the above described findings, and its gist lies in the methods for producing a steel component shown below.

(1) A method for producing a steel component by performing the treatments of the following sequentially steps 1 and 2 to a steel material containing, by mass %, C: 0.15 to 0.25%,
Si: 0.01 to 0.10%,
Mn: 0.50 to 0.80%,
S: 0.003 to 0.030%,
Cr: 0.80 to 1.20%,
Mo: 0.30 to 0.45%,
Al: 0.015 to 0.050%, and
N: 0.010 to 0.025%, wherein fn represented by Formula (1) shown below is 1.3 to 2.4, the balance being Fe and impurities, and contents of P and O among the impurities are P: not more than 0.010%, and
O: not more than 0.0020%:

step 1: a treatment which holds the steel material at a temperature of 850 to 1000° C. in a carburizing atmosphere or carbonitriding atmosphere, and step 2: a treatment which quenches the carburized or carbonitrided steel material, by using quenching oil having a temperature of 40 to 80° C. and a kinetic viscosity of 20 to 25 mm$^2$/s at 40° C.;

$$fn = Cr/Mn \qquad (1)$$

where, Cr and Mn in Formula (1) represent the content of each element in mass %.

(2) The method for producing a steel component according to the above (1), wherein the step 1 includes a holding process at a temperature of 850 to 1000° C. in a carburizing atmosphere or carbonitriding atmosphere followed by a holding process at a temperature of 800 to 900° C. in a carburizing atmosphere or carbonitriding atmosphere.

(3) The method for producing a steel component according to the above (1) or (2), wherein the steel material contains, in mass %, Nb: not more than 0.08% in lieu of a part of Fe.

It is noted that the "impurities" in the "Fe and impurities" as the balance refer to those which are mixed from ores and scraps as the raw material or from production environments when the steel material is industrially produced.

The holding process at a temperature of 800 to 900° C. in a carburizing atmosphere or carbonitriding atmosphere following the holding process at a temperature of 850 to 1000° C. in a carburizing atmosphere or carbonitriding atmosphere refers to a so-called "heating treatment for quenching".

Advantageous Effect(s) of the Invention

According to the present invention, it is possible to obtain a steel component which has excellent high-cycle bending fatigue strength, low-cycle bending fatigue strength, and pitting resistant strength despite small contents of expensive alloying elements, and furthermore can ensure sufficient machinability in the cutting process or sufficient cold forgeability in the net-shape forming process at the time of production, and in which the variation of heat treatment distortion at the time of carburizing-quenching or carbonitriding-quenching is suppressed.

BRIEF DESCRIPTION OF THE DRAWING(S)

Figure 3:
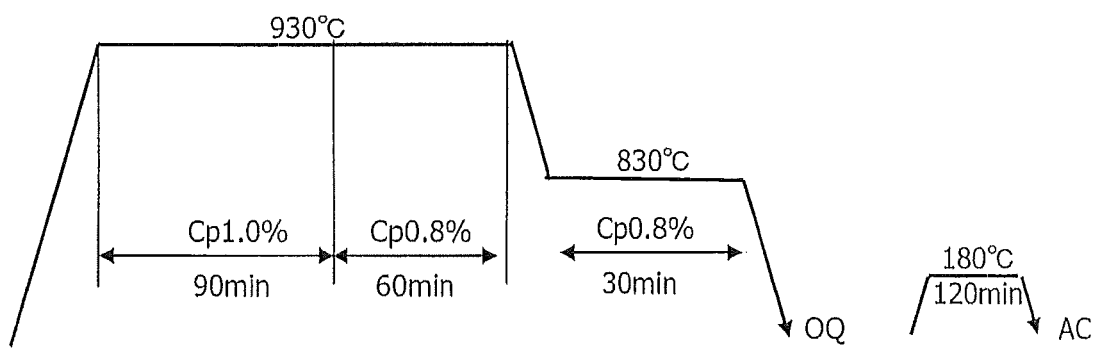

FIG. 3 is a diagram showing a heat pattern of "carburizing-quenching and tempering" which is applied to various test specimens used in Examples. In the figure, "930° C.", "830° C.", and "180° C." refer to "carburizing temperature", "heating temperature for quenching", and "tempering temperature", respectively. "Cp" represents "carbon potential". "OQ" represents "oil quenching". Atmospheric cooling is exploited for the cooling after tempering, and is designated as "AC" in the figure.

Figure 4:
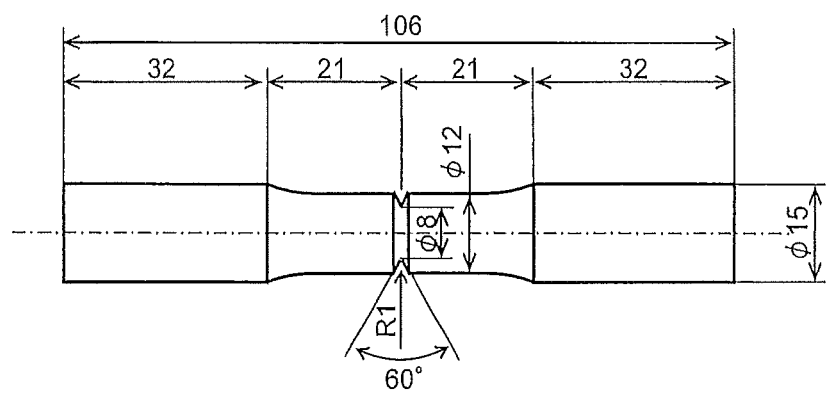

FIG. 4 is a diagram showing the shape of an Ono-type rotating bending fatigue test specimen used for evaluating high-cycle bending fatigue strength in Examples. Where, the unit of the dimensions in the figure is "mm".

Figure 5:
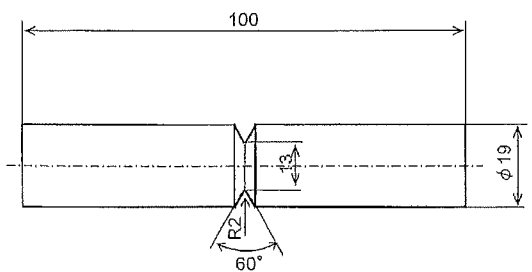

FIG. 5 is a diagram showing the shape of a 4-point bending fatigue test specimen which is used for evaluating the low-cycle bending fatigue strength in Examples. The unit of the dimensions in the figure is "mm".

Figure 6:
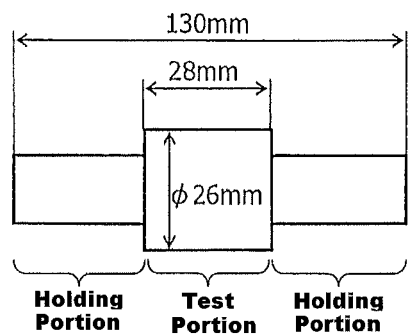

FIG. 6 is a diagram showing the shape of a roller-pitting small roller specimen used in Examples.

Figure 7:
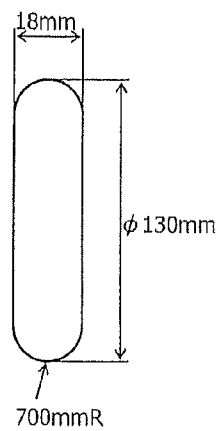

FIG. 7 is a diagram showing the shape of a roller-pitting large roller specimen used in Examples.

Figure 8:
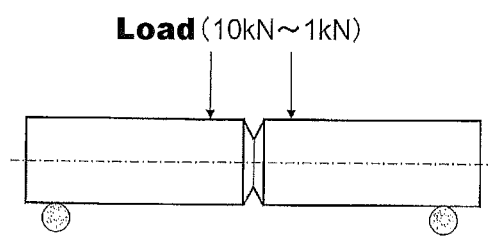

FIG. 8 is a diagram to illustrate "4-point bending fatigue test" for evaluating the low-cycle bending fatigue strength conducted in Examples.

Figure 9:
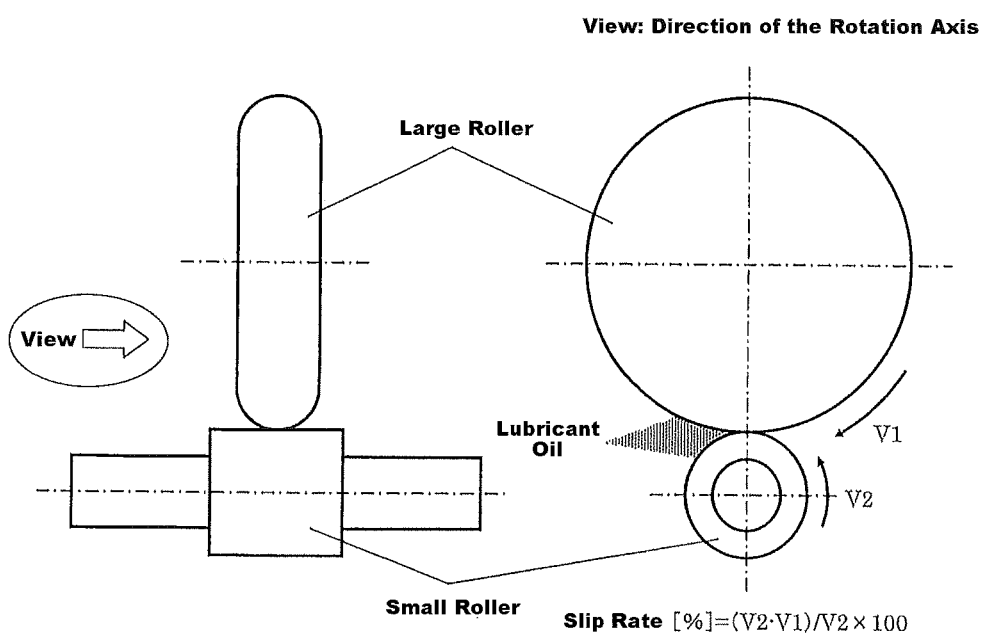

FIG. 9 is a diagram to illustrate a roller pitting test conducted in Examples.

MODE FOR CARRYING OUT THE INVENTION

Hereafter, each requirement of the present invention will be described in detail. It is noted that "%" of the content of each element means "mass %".

(A) Chemical Composition of Steel Material:

C: 0.15 to 0.25%

C (carbon) is an essential element to ensure the core strength (the strength of the base metal) of a steel component subjected to carburizing-quenching or carbonitriding quenching, and its content needs to be not less than 0.15%. However, if the content of C increases to exceed 0.25%, increase in the amount of deformation (heat treatment distortion) of the component when subjected to carburizing-quenching or carbonitriding quenching becomes pronounced. Therefore, the content of C is specified to be 0.15 to 0.25%. The lower limit of the content of C is preferably 0.16%, and the upper limit thereof is preferably 0.23%.

Si: 0.01 to 0.10%

Si (silicon) increases the intergranular oxidation depth when performing carburizing treatment or carbonitriding treatment. Particularly, if its content exceeds 0.10%, the intergranular oxidation depth significantly increases and thereby the bending fatigue strength significantly deteriorates, making it impossible to achieve the object of the present invention. However, at the time of mass production, it is difficult to control the content of Si to be less than 0.01%. Therefore, the content of Si is specified to be 0.01 to 0.10%. The upper limit of the content of Si is preferably 0.09%. It is noted that considering the production cost at the time of mass production, the lower limit of Si content is preferably 0.03%.

Mn: 0.50 to 0.80%

Mn (manganese), which has a significant effect of increasing the hardenability, is an essential element to ensure the core strength of the component when subjected to carburizing-quenching or carbonitriding quenching, and its content needs to be not less than 0.50%. However, if the content of Mn increases to exceed 0.80%, not only its effect is saturated, but also machinability in cutting process as well as cold forgeability during net-shape forming remarkably deteriorates. Therefore, the content of Mn is specified to be 0.50 to 0.80%. The lower limit of the content of Mn is preferably 0.55%, and the upper limit thereof is preferably 0.75%.

S: 0.003 to 0.030%

S (sulfur) combines with Mn to form MnS, thereby improving machinability. However, when its content is less than 0.003%, the aforementioned effect is not likely to be achieved. On the other hand, when the content of S increases, coarse MnS tends to be produced thereby deteriorating low-cycle bending fatigue strength, and particularly, if the content of S exceeds 0.030%, the deterioration of the low-cycle bending fatigue strength becomes pronounced. Therefore, the content of S is specified to be 0.003 to 0.030%. The lower limit of the content of S is preferably 0.005%, and the upper limit thereof is preferably 0.020%.

Cr: 0.80 to 1.20%

Cr (chromium) is an element which has a significant effect of increasing the hardenability and the tempering softening resistance and is effective to improve the bending fatigue strength and the pitting resistant strength. However, when the content of Cr is less than 0.80%, the above described effect is not sufficient, and it is not possible to achieve excellent bending fatigue strength and pitting resistant strength, which are an object of the present invention. On the other hand, if the content of Cr exceeds 1.20%, bainite becomes to be easily produced in the microstructure before cutting or the microstructure before net-shape forming, that is, the microstructure after hot forging, or the microstructure after normalizing when normalizing treatment is performed after hot forging. For this reason, increase in the material hardness leads to increase in the cutting resistance, thereby deteriorating machinability, and also deformation resistance increases, thereby deteriorating cold forgeability. Therefore, the content of Cr is specified to be 0.80 to 1.20%. The lower limit of the content of Cr is preferably 0.90%, and the upper limit thereof is preferably 1.10%.

Mo: 0.30 to 0.45%

Mo (molybdenum) is an element which has a significant effect of increasing the hardenability and the tempering softening resistance and is effective to improve the high-cycle bending fatigue strength, the low-cycle bending fatigue strength, and the pitting resistant strength. However, when the content of Mo is less than 0.30%, since the production of pearlite in the vicinity of grain boundary oxides cannot be suppressed, it is not possible to obtain excellent high-cycle bending fatigue strength and pitting resistant strength which are an object of the present invention. On the other hand, when the content of Mo exceeds 0.45%, bainite becomes to be easily produced in the microstructure before cutting or net-shape forming, that is, the microstructure after hot forging, or the microstructure after normalizing when normalizing treatment is performed after hot forging. For that reason, increase in the material hardness leads to increase in cutting resistance, thereby deteriorating machinability, and also leads to deformation resistance, thereby deteriorating cold forgeability. Therefore, the content of Mo is specified to be 0.30 to 0.45%. The lower limit of the content of Mo is preferably 0.31%, and the upper limit thereof is preferably 0.40%.

Al: 0.015 to 0.050%

Al (aluminum) has a deoxidizing action. Further, Al is an element which combines with N to form AlN and is effective in preventing the coarsening of austenite grains during carburizing or carbonitriding. However, when the content of Al is less than 0.015%, it is not possible to stably prevent the coarsening of austenite grains, and when the coarsening occurs, the high-cycle bending fatigue strength and the low-cycle bending fatigue strength will be deteriorated. On the other hand, if the content of Al exceeds 0.050%, it becomes easy to form coarse oxides, thereby deteriorating the bending fatigue strength. For that reason, the content of Al is specified to be 0.015 to 0.050%. The lower limit of the content of Al is preferably 0.016%, and the upper limit thereof is preferably 0.040%.

N: 0.010 to 0.025%

N (nitrogen) combines with Al to form AlN, and also combines with Nb to form NbN. The above AlN and NbN have an effect of preventing the coarsening of austenite grains during carburizing or carbonitriding. However, when the content of N is less than 0.010%, since the formation of the nitrides becomes unstable, it is not possible to stably prevent the coarsening of austenite grains. On the other hand, when the content of N exceeds 0.025%, stable production becomes difficult in mass production in the steel making process. For that reason, the content of N is specified to be 0.010 to 0.025%. The lower limit of the content of N is preferably 0.011%, and the upper limit thereof is preferably 0.022%.

fn: 1.3 to 2.4

The steel material used in the production method of the present invention must have a fn of 1.3 to 2.4, where fn is represented as:

$$fn = Cr/Mn \quad (1)$$

where, C and Mn in Formula (1) mean the content of each element in mass %.

To reduce the intergranular oxidation depth, although it is effective as described above to reduce the content of Si, that is not sufficient, and it becomes possible to utilize such effect by controlling fn, which is the ratio between the contents of Cr and Mn, to be within a specific range. When fn is less than 1.3, since the intergranular oxidation caused by Mn becomes pronounced, it is not possible to sufficiently achieve the effect of reducing the intergranular oxidation depth by reducing the content of Si. On the other hand, even if fn increases to more than 2.4, the above described effect of decreasing the intergranular oxidation depth will be saturated.

The lower limit of fn is preferably 1.4 within the range of the contents of Cr and Mn described so far, and the upper limit thereof is preferably 2.2.

One chemical composition of the steel material to be used in a production method of the present invention contains the above described elements, with the balance being Fe and impurities, in which the contents of P and O are P: not more than 0.010% and O: not more than 0.0020%.

It is noted that the "impurities" in the "Fe and impurities" as the balance refer to for example P which is mixed from ores as the raw material, for example Cu and Ni which are mixed from scraps, or for example O (oxygen) which is mixed from the production environments when the steel material is industrially produced.

However, it is necessary to limit P and O in the impurities in a particularly strict manner, which will be described below.

P: not more than 0.010%

Since P (phosphorus) is an element which is likely to segregate at grain boundaries thereby embrittling the grain boundaries, when the content thereof exceeds 0.010%, it deteriorates the low-cycle bending fatigue strength. Therefore, the content of P in the impurities is specified to be not more than 0.010%. The content of P in the impurities is preferably not more than 0.008%.

O: not more than 0.0020%

Since O (oxygen) is likely to combine with Al to form hard oxide-base inclusions, thereby deteriorating the bending fatigue strength. Particularly, when the content of O exceeds 0.0020%, the deterioration of the bending fatigue strength becomes pronounced. Therefore, the content of O in the impurities is specified to be not more than 0.0020%. It is noted that although the content of O in the impurities is preferably as low as possible, considering the cost in the steel making process, the lower limit thereof will be around 0.0010%.

Another chemical composition of the steel material to be used in a production method of the present invention contains Nb in lieu of part of Fe described above. Hereafter, advantageous effects of Nb which is an optional element and the reason to limit the content thereof will be described.

Nb: not more than 0.08%

Nb (niobium), which is likely to combine with C and N to form NbC, NbN, and Nb(C,N), is an element which is effective to supplement the above described effect of AlN to prevent the coarsening of austenite grains during carburizing or carbonitriding. For that reason, Nb may be contained. However, when the content of Nb increases to exceed 0.08%, the effect of preventing the coarsening of austenite grains will rather deteriorate. Therefore, the upper limit of the amount of Nb, when it is contained, is specified to be not more than 0.08%. The amount of Nb, when it is contained, is preferably not more than 0.06%.

On the other hand, to stably obtain the above described effect of Nb, the content of Nb is preferably not less than 0.01%, and is further preferably not less than 0.02%.

(B) Production Condition of Steel Component:

A method for producing a steel component according to the present invention is characterized by performing the treatments of the following sequentially steps 1 and 2 to the steel material having the chemical composition according to term (A) described above:

Step 1: a treatment which holds the steel material at a temperature of 850 to 1000° C. in a carburizing atmosphere or carbonitriding atmosphere.

Step 2: a treatment which quenches the carburized or carbonitrided steel material, by using quenching oil having a temperature of 40 to 80° C. and a kinetic viscosity of 20 to 25 mm$^2$/s at 40° C.

The steel component relating to the present invention is specifically produced by, for example, the following process.

First, a steel satisfying the chemical composition according to term (A) is melted and is subjected to casting, billeting, and so on, and thereafter the steel is subjected to hot rolling as the final process to produce a hot rolled steel bar or wire rod.

Next, the hot rolled steel bar or wire rod is hot forged to be roughly formed into an intermediate product having a predetermined shape.

The roughly formed intermediate product, or an intermediate product which has been subjected to normalizing treatment after the rough forming is subjected to cutting to be formed into a predetermined component shape.

Alternatively, the roughly formed intermediate product is subjected to net-shape forming by cold forging, in place of the cutting, after being subjected to normalizing treatment as needed.

Carburizing-quenching or carbonitriding-quenching is performed on the intermediate product after the cutting or the net-shape forming in the order of step 1 and step 2.

Tempering may be conducted after the carburizing-quenching or carbonitriding-quenching is performed.

Moreover, shotpeening and/or surface grinding may be conducted after the carburizing-quenching or carbonitriding-quenching is performed.

Shotpeening and/or surface grinding may be performed after further conducting tempering after the carburizing-quenching or carbonitriding-quenching.

It is noted that there is no need of particularly limiting conditions of the processes from the melting of steel till the production of the hot rolled steel bar or wire rod.

Provided that the hot rolled steel bar or wire rod satisfies the chemical composition according to term (A), the hot rolled steel bar or wire rod may be produced at commonly used conditions for all the processes such as the melting, casting, billeting, and hot rolling of the steel.

Moreover, there is also no need of particularly limiting the condition of the process for obtaining an intermediate product which has been roughly formed by hot forging a hot rolled steel bar or wire rod.

The material to be hot forged (the hot rolled steel bar or wire rod) may be roughly formed into an intermediate product having a predetermined, shape at commonly used conditions for all the processes such as the temperature to heat it, the reduction rate of forging, the finishing temperature of forging, the cooling condition after forging, and the like.

Further, there is also no need of particularly limiting the condition at which normalizing treatment is performed on the roughly formed intermediate product, and the normalizing treatment may be performed in a commonly used manner.

There is also no need of particularly limiting the condition at which the intermediate product which has been roughly formed, or the intermediate product which has been further subjected to normalizing treatment after being roughly formed, is cut into a predetermined component shape, and the cutting may be performed in a commonly used manner.

Moreover, there is also no need of particularly limiting the condition at which the intermediate product which has been roughly formed, or the intermediate product which has been further subjected to normalizing treatment after being roughly formed, is subjected to cold forging to be net-shape formed into a predetermined component shape, and the net-shape forming may be performed in a commonly used manner.

It is necessary that the treatments of step 1 and step 2 be sequentially performed on the intermediate product which has been subjected to cutting, or to net-shape forming.

It is noted that the step 1 may include a holding process at a temperature of 850 to 1000° C. in a carburizing atmosphere or carbonitriding atmosphere followed by a holding process at a temperature of 800 to 900° C. in a carburizing atmosphere or carbonitriding atmosphere.

After the carburizing-quenching or carbonitriding-quenching is performed, tempering may be further performed, as needed, at a temperature of 100 to 200° C. Provided the temperature is 100 to 200° C., there is no need of particularly limiting other conditions for the tempering, and tempering may be performed in a commonly used manner.

Further, shotpeening and/or surface grinding may be performed after the carburizing-quenching or carbonitriding-quenching is performed, or the tempering is performed.

There is no need of particularly limiting the condition of the shotpeening, and the shotpeening may be performed in a commonly used manner. Similarly, there is no need of particularly limiting the condition of surface grinding, and the surface grinding may be performed in a commonly used manner.

Hereafter, the conditions for the carburizing-quenching or carbonitriding-quenching of steps 1 and 2, which are to be sequentially performed on the intermediate product which has been subjected to cutting or net-shape forming will be described in detail.

When performing carburizing or carbonitriding, holding the intermediate product in a carburizing atmosphere or carbonitriding atmosphere having a temperature of more than 1000° C. is likely to cause coarsening of crystal grains leading to deterioration of the strength after carburizing-quenching or carbonitriding-quenching. On the other hand, holding the intermediate product in a carburizing atmosphere or carbonitriding atmosphere having a temperature of less than 850° C. makes it difficult to obtain a sufficient case depth after the carburizing-quenching or carbonitriding-quenching. Therefore, it is determined that, first, the treatment of step 1, that is, carburizing or carbonitriding is performed on the intermediate product while being held in a carburizing atmosphere or carbonitriding atmosphere having a temperature of 850 to 1000° C. The lower limit of the holding temperature is preferably 900° C., and the upper limit thereof is preferably 980° C.

Although the holding time at the temperature of the carburizing atmosphere or carbonitriding atmosphere depends on the required case depth, it may be, for example, about 2 to 15 hours.

There is no need of particularly limiting the carbon potential in the carburizing atmosphere, and it may be appropriately determined from viewpoints of a targeted surface carbon concentration, an effective case depth, efficient operation and the like.

For the "carburizing", "gas carburizing" may be applied in which carburizing is performed by using an atmosphere obtained by adding gas which is referred to "enriching gas", such as butane and propane, to so-called "RX gas" which is endothermic and is a gaseous mixture of CO, $H_2$, and $N_2$ obtained by mixing and modifying hydrocarbon gas such as butane and propane with air. In this case, the carbon potential can be controlled in most cases by the amount of addition of enriching gas.

Similarly, there is also no need of particularly limiting the carbon potential and nitrogen potential in the carbonitriding atmosphere, and they may be appropriately determined from viewpoints of a targeted surface carbon concentration, a surface nitrogen concentration, an effective case depth, efficient operation, and the like.

For "carbonitriding", "gas carbonitriding" can be applied in which carbonitriding is performed by using an atmosphere which is obtained by adding ammonia to the carburizing gas described above. In this case, the carbon potential and nitrogen potential can be controlled by the adding amount of the enriching gas and the ammonia gas, respectively.

Moreover, performing the holding process in a carburizing atmosphere or carbonitriding atmosphere having a temperature of 800 to 900° C. as the heating treatment for quenching, following the holding process in a carburizing atmosphere or carbonitriding atmosphere having a temperature of 850 to 1000° C. makes it possible to perform stable carburizing or carbonitriding at a reduced amount of heat treatment distortion. The lower limit of the above described heat treatment temperature for quenching is preferably 830° C., and the upper limit thereof is preferably 880° C.

When performing the above described heating treatment for quenching, the holding time in the carburizing atmosphere or carbonitriding atmosphere having a temperature of 800 to 900° C. may be, for example, around 0.5 to 2 hours.

There is no need of particularly limiting the carbon potential in the carburizing atmosphere when performing heating treatment for quenching, and it may be appropriately determined from viewpoints of a targeted surface carbon concentration, an effective case depth, and efficient operation, etc.

Similarly, there is also no need of particularly limiting the carbon potential and the nitrogen potential in the carbonitriding atmosphere when performing heating treatment for quenching, and they may be appropriately determined from viewpoints of a targeted surface carbon concentration, an effective case depth, and efficient operation, etc.

Next, the reason why quenching of the intermediate product which has been subjected to carburizing or carbonitriding is performed by using quenching oil having a temperature of 40 to 80° C. and a kinetic viscosity of 20 to 25 $mm^2/s$ at 40° C. is described.

As already described above, when carburizing-quenching or carbonitriding-quenching is performed using oil having a temperature of around 100 to 150° C., the intermediate product may be subjected to self-tempering during quenching treatment so that film-like cementite is produced at grain boundaries. For this reason, the low-cycle bending fatigue strength will not be improved. Therefore, it is necessary that the intermediate product is rapidly cooled so as not to be subjected to self-tempering during carburizing-quenching or carbonitriding-quenching. Accordingly, although it is necessary to use a quenching oil of low temperature, in the case of a quenching oil having a temperature of less than 40° C., the kinetic viscosity becomes excessively large, and the flowability of the quenching oil at the time of quenching decreases, resulting in a problem that the convective stirring effect of oil decreases and difference in cooling power occurs between upper and lower positions of the oil bath, thus leading to increase in the variation of heat treatment distortion. On the other hand, in the case of quenching oil having a temperature of more than 80° C., it is not possible to stably suppress the film-like cementite from being produced at grain boundaries due to self-tempering. Further, in this case, since the degradation of the additive to the quenching oil is likely to proceed, the kinetic viscosity of the oil is likely to increase as it is repeatedly used, resulting in increase in the variation of heat treatment distortion, and also, since the volatilization amount of quenching oil increases, the frequency to replace the quenching oil increases.

Therefore, when performing carburizing-quenching or carbonitriding-quenching, it is necessary to use quenching oil having a temperature of 40 to 80° C. The upper limit of the temperature of the quenching oil is preferably 60° C.

By using quenching oil having a low kinetic viscosity upon quenching, it becomes possible to lower the starting temperature of the "convection heat transfer" stage and thus expand the temperature range of the "nucleate boiling heat transfer" stage, thereby increasing the hardness of the outer layer of the component. When the kinetic viscosity at 40° C. is not more than 25 $mm^2/s$, the above described effect can be stably achieved. Furthermore, since decreasing the kinetic viscosity at 40° C. causes the convection of the oil to be more likely to occur even in the stage of "convection heat transfer", it is inferred that the cooling rate in the vicinity of the Ms point will become faster.

On the other hand, when the kinetic viscosity at 40° C. is less than 20 $mm^2/s$, since the oil becomes likely to be degraded due to the repetition of quenching, it becomes necessary to frequently replace the oil, thereby increasing costs. Therefore, the kinetic viscosity of quenching oil is specified to be 20 to 25 $mm^2/s$ at 40° C.

It is noted that in the case of conventional quenching oil which has been used at a temperature of around 100 to 150° C., the kinetic viscosity is as large as not less than 100 $mm^2/s$ at a temperature as low as 40° C. Since, for that reason, the flowability is low at the oil temperature of 40 to 80° C. and the convective stirring effect of oil is small, difference in cooling power occurs between upper and lower positions of the oil bath, thus leading to increase in the variation of heat treatment distortion.

The lower limit of the kinetic viscosity of the quenching oil at 40° C. is preferably 21 $mm^2/s$, and the upper limit thereof is preferably 24 $mm^2/s$.

Hereafter, although the present invention will be described in more detail by way of Examples, the present invention will not be limited to those Examples.

EXAMPLE(S)

Example 1

Each of Steels "a" to "e" having chemical compositions shown in Table 1 was melted in an amount of 180 kg in a vacuum furnace, and thereafter was cast into a mold having a diameter of 210 mm to obtain an ingot, the ingot thereafter being cooled to the room temperature.

It is noted that Steel "d" in Table 1 was a steel which had a chemical composition within the range specified in the present invention.

On the other hand, Steels "a" to "c" and Steel "e" are steels of Comparative Examples whose chemical compositions deviated from the condition specified in the present invention. Among those, Steel "e" was a high-Ni and high-Mo steel.

TABLE 1

| | Chemical composition (mass %) Balance: Fe and impurities | | | | | | | | | | | |
|---|---|---|---|---|---|---|---|---|---|---|---|---|
| Steel | C | Si | Mn | P | S | Ni | Cr | Mo | Al | N | O | fn |
| a | 0.18 | 0.33 | *1.40 | *0.011 | 0.018 | — | *0.65 | *— | 0.033 | 0.0122 | 0.0015 | *0.5 |
| b | 0.20 | 0.33 | *0.81 | *0.015 | 0.018 | — | 1.11 | *— | 0.028 | 0.0144 | 0.0010 | 1.4 |
| c | 0.18 | 0.26 | 0.79 | *0.016 | 0.016 | — | 1.10 | *0.16 | 0.030 | 0.0150 | 0.0010 | 1.4 |

TABLE 1-continued

| | Chemical composition (mass %) Balance: Fe and impurities | | | | | | | | | | | |
|---|---|---|---|---|---|---|---|---|---|---|---|---|
| Steel | C | Si | Mn | P | S | Ni | Cr | Mo | Al | N | O | fn |
| d | 0.19 | 0.05 | 0.60 | 0.007 | 0.012 | — | 0.90 | 0.30 | 0.026 | 0.0144 | 0.0018 | 1.5 |
| e | 0.20 | 0.05 | 0.50 | 0.010 | 0.010 | *0.50 | *0.66 | *0.66 | 0.025 | 0.0151 | *0.0021 | 1.3 | fn = Cr/Mn
*mark indicates deviation from the condition specified in the present invention.

Each ingot of Steels "a" to "e" described above was subjected to hot forging after being held at 1250° C. for 120 min to be finished into a steel bar having a diameter of 70 mm at a temperature of not less than 1000° C., and thereafter was allowed to cool to the room temperature in the atmosphere.

Each steel bar described above was subjected to "normalizing", in which it was held at 925° C. for 60 min and thereafter allowed to cool to the room temperature in the atmosphere.

Figure 1:
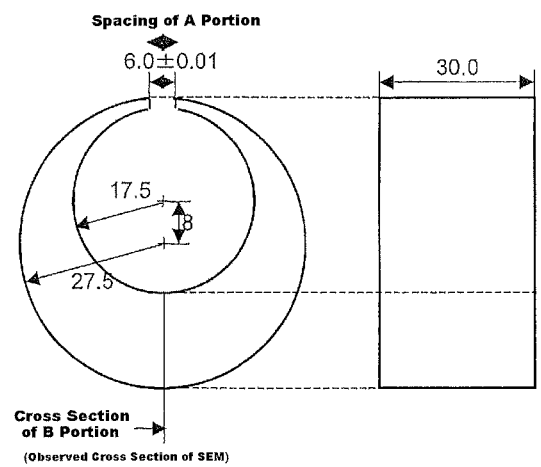
FIG. 1 is a diagram showing the shape of a specimen for measuring the amount of variation of heat treatment distortion, which is used in Examples. Where, the unit of the dimensions in the figure is "mm".

After the normalizing, 60 specimens for measuring the amount of variation of heat treatment distortion, which had the shape shown in FIG. 1, were fabricated from the central portion of steel bar for each steel. It is noted that specimens were taken in each steel such that the axial direction of the steel bar coincided with the axial direction of specimen.

By using those specimens, the amount of variation of quenching distortion at the time of carburizing-quenching was evaluated.

Figure 2:
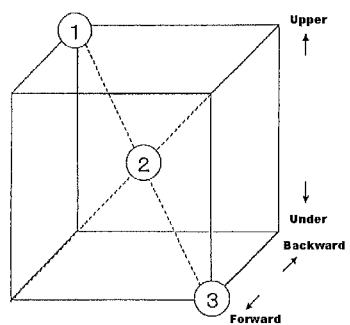
FIG. 2 is a diagram to illustrate the positions where the specimens for measuring the amount of variation of heat treatment distortion in FIG. 1 are disposed in a basket in carburizing-quenching performed in Examples. Numerals "1", "2", and "3" represent "left-upper-rear", "center", and "right-lower-front" positions, respectively.

To be specific, for each steel, five specimens, for which the spacing of A portion in FIG. 1 was measured by a micrometer in advance before carburizing-quenching, were disposed in each of three positions: left-upper-rear, center, and right-lower-front positions, of a heat treatment basket as shown in FIG. 2, and were subjected to carburizing-quenching by a batch type gas carburizing furnace. After quenching, tempering was performed. It is noted that numerals "1", "2", and "3" in FIG. 2 represent the above described "left-upper-rear", "center", and "right-lower-front" positions of disposition in the basket, respectively.

FIG. 3 shows a heat pattern of "carburizing-quenching and tempering". It is noted that "Cp" represents "carbon potential" in FIG. 3. Moreover, "OQ" represents "oil quenching", which was performed by using oils of conditions [i] to [iv] shown in Table 2. Atmospheric cooling was exploited for the cooling after tempering, and is designated as "AC" in the figure.

TABLE 2

| Condition of quenching oil | Kinetic viscosity at 40° C. (mm²/s) | Oil temperature (° C.) |
|---|---|---|
| [i] | 23 | 50 |
| [ii] | *300 | *120 |
| [iii] | 23 | *120 |
| [iv] | *28 | 50 |

*mark indicates deviation from the condition specified in the present invention.

After quenching was performed by using oil of each condition and subsequently tempering was performed, the spacing of A portion was measured by a micrometer to determine the difference in the spacing of A portion between before and after "carburizing-quenching and tempering". It was assumed that the amount of distortion be the average value of the differences in the spacing of A portion for each five (a total of 15) specimens which were disposed in "1" to "3" positions in the heat treatment basket. Moreover, the standard deviation of the difference in the spacing of A portion for the 15 specimens described above was calculated to evaluate the variation of quenching distortion.

Moreover, one specimen was arbitrarily selected for each condition out of the specimens for which the spacing of portion A was measured by a micrometer after "carburizing-quenching and tempering", and a longitudinal section of B portion in FIG. 1 of the specimen was mirror-ground to thereafter observe an outer layer portion on the outer peripheral side of the section of B portion at a magnification of 1000 times by using an optical microscope; and the section was further etched with Nital to observe the outer layer portion at a magnification of 3000 times by using a scanning electron microscope (hereafter, referred to as "SEM").

In the observation at a magnification of 1000 time by using the optical microscope, an intergranular oxidation depth was measured. Moreover, in the observation at a magnification of 3000 times, the presence or absence of slack quenching structure in the microstructure particularly in the vicinity of grain boundary oxides was investigated.

Table 3 organizes and shows the test results described above. It is noted that in Table 3, the "amount of distortion" refers to the average value of the differences in the spacing of "A" portion for each five specimens of 1 to 3 positions, that is, 15 specimens in total. Moreover, the "intergranular oxidation depth" refers to a maximum intergranular oxidation depth among those observed in B portion.

TABLE 3

| Test number | Steel | Condition of quenching oil | Amount of distortion (mm) | Variation of quenching distortion (standard deviation) | Intergranular oxidation depth (μm) | Presence or absence of slack quenching structure |
|---|---|---|---|---|---|---|
| 1 | *a | [i] | 0.41 | 0.010 | 17.8 | Present |
| 2 | *b | | 0.43 | 0.012 | 11.1 | Present |
| 3 | *c | | 0.43 | 0.012 | 11.7 | Present |
| 4 | d | | 0.43 | 0.011 | 4.7 | Absent |
| 5 | *e | | 0.47 | 0.012 | 15.3 | Absent |

TABLE 3-continued

| Test number | Steel | Condition of quenching oil | Amount of distortion (mm) | Variation of quenching distortion (standard deviation) | Intergranular oxidation depth (μm) | Presence or absence of slack quenching structure |
|---|---|---|---|---|---|---|
| 6 | *a | [ii] | 0.33 | 0.010 | 18.2 | Present |
| 7 | *b |  | 0.35 | 0.011 | 11.8 | Present |
| 8 | *c |  | 0.35 | 0.013 | 12.5 | Present |
| 9 | d |  | 0.36 | 0.011 | 5.1 | Present |
| 10 | *e |  | 0.41 | 0.012 | 16.2 | Present |
| 11 | *a | [iii] | 0.34 | 0.012 | 18.0 | Present |
| 12 | *b |  | 0.35 | 0.012 | 11.5 | Present |
| 13 | *c |  | 0.35 | 0.013 | 12.2 | Present |
| 14 | d |  | 0.38 | 0.012 | 4.9 | Present |
| 15 | *e |  | 0.39 | 0.014 | 15.8 | Absent |
| 16 | *a | [iv] | 0.41 | 0.012 | 18.5 | Present |
| 17 | *b |  | 0.42 | 0.012 | 12.2 | Present |
| 18 | *c |  | 0.42 | 0.014 | 12.2 | Present |
| 19 | d |  | 0.43 | 0.013 | 5.5 | Present |
| 20 | *e |  | 0.45 | 0.014 | 16.8 | Absent |

*mark indicates deviation from the condition specified in the present invention.

From Table 3, it is clear that although there was no recognizable difference in the variation of quenching distortion at A portion of specimen among conditions [i] to [iv] of quenching oil, there are some differences in the observation results of B portion of specimen by using SEM.

First, regarding slack quenching structure, the results were as follows.

In Steel "e" having high contents of Ni and Mo, no slack quenching structure was recognized in conditions [i], [iii], and [iv] of quenching oil. Moreover, in Steel "d", slack quenching structure was not recognized only in the case of condition [i] of quenching oil. On the other hand, in Steels "a" to "c", some slack quenching structure was recognized in all of conditions [i] to [iv] of quenching oil.

Next, regarding the intergranular oxidation depth, it was as small as 4.7 to 5.5 μm regardless the condition of quenching oil in the case of Steel "d" whose chemical composition was within the range specified in the present invention. In contrast to this, in the case of Steels "a" to "c" and Steel "e" whose chemical compositions deviated from the condition specified in the present invention, the intergranular oxidation depth was as large as not less than 11.1 μm, and therefore was worse than in the case of Steel "d".

That is, in the case of Steels "a" to "c" whose chemical compositions deviated from the condition specified in the present invention, even in the case of [i] in which the quenching oil satisfied the condition specified in the present invention, it was not possible to suppress slack quenching structure, and further the intergranular oxidation depth was large.

In contrast to this, in the case of Steel "d" whose chemical composition was within the range specified in the present invention, by performing quenching by using oil [i] which satisfied the condition specified in the present invention, it was possible to suppress the production of slack quenching structure as in Steel "e" which was a high-Ni and high-Mo steel, and further to keep the variation of heat treatment distortion at the same level as in conventional art. Furthermore, in the case of Steel "e", the intergranular oxidation depth was large, and therefore worse than in the case of Steel "d".

Example 2

Each of Steels 1 to 31 having chemical compositions shown in Tables 4 and 5 was melted in an amount of 180 kg in a vacuum furnace, and thereafter was cast into a mold having a diameter of 210 mm to obtain an ingot, the ingot thereafter being cooled to the room temperature.

It is noted that Steels 1 to 13 in Table 4 were steels each of which had a chemical composition within the range specified in the present invention.

On the other hand, Steels 14 to 31 in Tables 4 and 5 were steels of Comparative Examples whose chemical compositions deviated from the condition specified in the present invention. Among those steels of Comparative Examples, Steel 15 was a steel corresponding to SCr420 specified in JIS G 4053 (2008).

TABLE 4

| | Chemical composition (mass %) Balance: Fe and impurities | | | | | | | | | | | |
|---|---|---|---|---|---|---|---|---|---|---|---|---|
| Steel | C | Si | Mn | P | S | Cr | Mo | Al | Nb | N | O | fn |
| 1 | 0.19 | 0.02 | 0.65 | 0.007 | 0.012 | 1.05 | 0.33 | 0.030 | — | 0.0144 | 0.0018 | 1.6 |
| 2 | 0.20 | 0.10 | 0.65 | 0.007 | 0.012 | 1.05 | 0.33 | 0.031 | — | 0.0150 | 0.0018 | 1.6 |
| 3 | 0.19 | 0.05 | 0.65 | 0.007 | 0.013 | 1.05 | 0.33 | 0.026 | — | 0.0150 | 0.0016 | 1.6 |
| 4 | 0.19 | 0.05 | 0.65 | 0.010 | 0.013 | 1.05 | 0.33 | 0.026 | — | 0.0150 | 0.0016 | 1.6 |
| 5 | 0.18 | 0.05 | 0.50 | 0.007 | 0.016 | 0.80 | 0.35 | 0.025 | — | 0.0150 | 0.0018 | 1.6 |
| 6 | 0.18 | 0.05 | 0.50 | 0.007 | 0.016 | 1.18 | 0.35 | 0.026 | — | 0.0150 | 0.0018 | 2.4 |
| 7 | 0.20 | 0.05 | 0.55 | 0.007 | 0.007 | 0.80 | 0.30 | 0.033 | — | 0.0150 | 0.0015 | 1.5 |
| 8 | 0.20 | 0.05 | 0.55 | 0.007 | 0.007 | 0.80 | 0.39 | 0.032 | — | 0.0150 | 0.0015 | 1.5 |
| 9 | 0.18 | 0.05 | 0.60 | 0.007 | 0.010 | 1.20 | 0.38 | 0.028 | — | 0.0150 | 0.0016 | 2.0 |
| 10 | 0.19 | 0.05 | 0.70 | 0.007 | 0.010 | 1.10 | 0.38 | 0.033 | 0.038 | 0.0150 | 0.0017 | 1.6 |
| 11 | 0.20 | 0.06 | 0.71 | 0.007 | 0.023 | 1.01 | 0.38 | 0.025 | 0.020 | 0.0150 | 0.0018 | 1.4 |
| 12 | 0.19 | 0.06 | 0.71 | 0.007 | 0.023 | 1.01 | 0.38 | 0.024 | 0.042 | 0.0150 | 0.0018 | 1.4 |

TABLE 4-continued

| | Chemical composition (mass %) Balance: Fe and impurities | | | | | | | | | | | |
|---|---|---|---|---|---|---|---|---|---|---|---|---|
| Steel | C | Si | Mn | P | S | Cr | Mo | Al | Nb | N | O | fn |
| 13 | 0.19 | 0.06 | 0.71 | 0.007 | 0.023 | 1.01 | 0.38 | 0.025 | 0.030 | 0.0150 | 0.0018 | 1.4 |
| 14 | 0.18 | *0.33 | *1.40 | *0.011 | 0.018 | *0.65 | *— | 0.033 | — | 0.0122 | 0.0015 | *0.5 |
| 15 | 0.20 | *0.33 | *0.81 | *0.015 | 0.018 | 1.11 | *— | 0.028 | — | 0.0144 | 0.0012 | 1.4 |
| 16 | 0.18 | *0.26 | 0.79 | *0.016 | 0.016 | 1.10 | *0.16 | 0.030 | — | 0.0150 | 0.0012 | 1.4 | fn = Cr/Mn
*mark indicates deviation from the condition specified in the present invention.

TABLE 5

| | Chemical composition (mass %) Balance: Fe and impurities | | | | | | | | | | | |
|---|---|---|---|---|---|---|---|---|---|---|---|---|
| Steel | C | Si | Mn | P | S | Cr | Mo | Al | Nb | N | O | fn |
| 17 | 0.18 | *0.25 | 0.65 | 0.007 | 0.013 | 1.00 | 0.32 | 0.035 | 0.038 | 0.0156 | 0.0013 | 1.5 |
| 18 | 0.22 | 0.05 | *0.30 | 0.007 | 0.007 | 1.00 | 0.32 | 0.035 | — | 0.0156 | 0.0016 | *3.3 |
| 19 | 0.22 | 0.05 | *1.00 | 0.008 | 0.007 | 1.00 | 0.32 | 0.035 | — | 0.0136 | 0.0016 | *1.0 |
| 20 | 0.21 | 0.06 | *0.40 | *0.018 | 0.007 | 1.40 | 0.32 | 0.020 | — | 0.0138 | 0.0018 | *3.5 |
| 21 | 0.21 | 0.09 | *0.40 | 0.008 | 0.026 | *0.50 | 0.35 | 0.025 | — | 0.0138 | 0.0012 | 1.3 |
| 22 | 0.23 | 0.09 | 0.75 | 0.008 | 0.020 | *1.40 | 0.35 | 0.025 | — | 0.0145 | 0.0012 | 1.9 |
| 23 | 0.20 | 0.09 | *0.40 | 0.008 | 0.026 | *1.40 | *0.20 | 0.023 | — | 0.0144 | 0.0013 | *3.5 |
| 24 | 0.23 | 0.09 | 0.75 | 0.008 | 0.026 | *1.40 | *0.50 | 0.025 | — | 0.0151 | 0.0013 | 1.9 |
| 25 | 0.18 | 0.09 | 0.80 | 0.008 | 0.028 | 0.80 | 0.31 | 0.025 | — | 0.0138 | 0.0015 | *1.0 |
| 26 | 0.23 | 0.05 | *0.40 | 0.008 | 0.029 | *1.40 | 0.35 | *0.010 | — | 0.0121 | 0.0015 | *3.5 |
| 27 | 0.18 | 0.05 | *0.40 | 0.008 | 0.025 | *1.40 | 0.35 | 0.035 | — | 0.0121 | 0.0016 | *3.5 |
| 28 | 0.18 | 0.06 | *0.40 | 0.008 | 0.030 | *1.40 | 0.35 | 0.030 | — | *0.0038 | 0.0014 | *3.5 |
| 29 | *0.05 | 0.07 | 0.79 | *0.015 | 0.015 | 1.01 | 0.38 | 0.036 | — | 0.0185 | *0.0021 | 1.3 |
| 30 | *0.30 | 0.05 | 0.79 | *0.015 | 0.015 | 1.01 | 0.38 | 0.036 | — | 0.0194 | *0.0021 | 1.3 |
| 31 | 0.20 | 0.06 | 0.80 | *0.050 | *0.038 | 1.10 | 0.37 | 0.035 | — | 0.0195 | 0.0010 | 1.4 | fn = Cr/Mn
*mark indicates deviation from the condition specified in the present invention.

Each ingot of Steels 1 to 31 described above was subjected to hot forging after being held at 1250° C. for 120 min to be finished into a steel bar having a diameter of 35 mm at a temperature of not less than 1000° C., and thereafter was allowed to cool to the room temperature in the atmosphere.

Each of the above described steel bars was subjected to "normalizing", in which it was held at 925° C. for 60 min and thereafter allowed to cool to the room temperature in the atmosphere.

From a central portion of each of thus obtained steel bars having a diameter of 35 mm after normalization, round bars were cut out which respectively had diameters of 10 mm, 20 mm, and 30 mm, and each had a length of 100 mm.

The round bars which were cut out to respectively have diameters of 10 mm, 20 mm, and 30 mm, and each has a length of 100 mm were subjected to "normalizing", in which they were held at 925° C. for 60 min and thereafter allowed to cool to the room temperature in the atmosphere. Moreover, during this cooling, the cooling rate from 800° C. to 500° C. was 0.8 to 1.2° C./sec.

A cross section at a position of a length of 50 mm of each round bar after normalization, which had a diameter of 10 mm, 20 mm, or 30 mm, was mirror-ground, and Vickers hardness was measured at four points at positions 2.5 mm, 5 mm, and 7.5 mm from the center by a Vickers hardness meter according to "Vickers hardness test-test method" described in JIS Z 2244 (2009). Where, the test force was 9.8N.

It was assumed that an average value of Vickers hardness (hereafter, referred to "HV") of each four points described above be the HV after normalization in the round bar having respective diameters. Furthermore, in each of the cases where the diameter was 10 mm, 20 mm, and 30 mm, when HV was not more than 192, evaluation was made that the hardness was low, and the machinability and cold forgeability were excellent.

Moreover, for each steel, 16 Ono-type rotating bending fatigue test specimens having the shape shown in FIG. 4, four 4-point bending fatigue test specimens having the shape shown in FIG. 5, and eight roller-pitting small roller specimens having the shape shown in FIG. 6 were cut out from the central portion of a steel bar having a diameter of 35 mm after normalization, each specimen being in parallel with the axial direction.

Each specimen described above was subjected to "carburizing-quenching and tempering" in the heat pattern shown in FIG. 3. Moreover, quenching was performed by using any of the oils of conditions [i] to [iv] shown in Table 2.

Each test specimen fabricated as described above was subjected to an Ono-type rotating bending fatigue test, a 4-point bending fatigue test, a roller pitting test, and an observation of the outer layer portion by using SEM.

Further, in test symbol S in Table 6 shown below, after notch portions of the Ono-type rotating bending fatigue test specimen and the 4-point bending fatigue test specimen, which had been subjected to "carburizing-quenching and tempering" were ground, and also after a 26 mm diameter portion of the roller pitting small roller specimen was ground, the ground portions were subjected to shotpeening at conditions of an arc height: 0.4 mmA and a coverage: 300%, using steel balls having a diameter of 0.6 mm and an HV of 800, and thereafter were subjected to the Ono-type rotating bending fatigue test, the 4-point bending fatigue test, the roller pitting test, and the observation of outer layer portion by using SEM.

Moreover, in Test symbol T in Table 6, shotpeening was performed at conditions of an arc height: 0.4 mmA and a coverage: 300% on the notch portions of the Ono-type rotating bending fatigue test specimen and the 4-point bending fatigue test specimen, and the 26 mm diameter portion of the roller pitting small roller specimen, which had been subjected to "carburizing-quenching and tempering", by using steel balls having a diameter of 0.6 mm and an HV of 800, and thereafter the notch portions of the Ono-type rotating bending fatigue test specimen and the 4-point bending fatigue test specimen, and the 26 mm diameter portion of the roller pitting small roller specimen were ground to be subjected to the Ono-type rotating bending fatigue test, the 4-point bending fatigue test, the roller pitting test, and the observation of outer layer portion by using SEM.

Moreover, a roller pitting large roller specimen having the shape shown in FIG. 7 and to be used for the roller pitting test was fabricated using SCM420H specified in JIS G 4052 (2008) by a commonly used production process, that is, processes of "normalizing, test specimen processing, eutectoid carburizing by a gas carburizing furnace, low temperature tempering, and grinding".

Hereafter, contents of each test will be described in detail.

<A> Observation of Outer Layer Portion Using SEM:

After the cross section of the notch portion of the Ono-type rotating bending fatigue test specimen was mirror-ground, the outer layer portion was observed at a magnification of 1000 times using an optical microscope to measure the intergranular oxidation depth. Further, the cross section was etched with Nital and the outer layer portion was observed at a magnification of 3000 times by using SEM to investigate the presence or absence of slack quenching structure in the vicinity of grain boundary oxides.

Further, it was aimed that no slack quenching structure is present in the outer layer portion.

<B> Ono-Type Rotating Bending Fatigue Test:

An Ono-type rotating bending fatigue test was conducted at below described test conditions by using eight Ono-type rotating bending fatigue test specimens to evaluate the "high-cycle bending fatigue strength" based on a maximum strength at which rupture does not occur at a number of repetitions of $1.0 \times 10^7$.

The test results were normalized by assuming that the rotating bending fatigue strength of Test symbol V in Table 6, which used Steel 15 corresponding to SCr420 specified in JIS G 4053 (2008), at a number of repetitions of $1.0 \times 10^7$ be 100. Then, when a specimen exhibited a rotating bending fatigue strength of more than 1.15 times the evaluation criterion, that is, more than 115, the specimen was estimated to have excellent high-cycle bending fatigue strength.

Temperature: room temperature
Atmosphere: the air
Number of revolutions: 3000 rpm <C> 4-Point Bending Fatigue Test:

A 4-point bending fatigue test was conducted by the method shown in FIG. 8 by using two 4-point bending fatigue test specimens. The number of repetitions at which the specimen was ruptured was investigated at test load: the maximum load is 10 kN and the minimum load is 1 kN, and at a repetition frequency of 20 Hz, to evaluate the "low-cycle bending fatigue strength".

The test results were normalized by assuming that the rupture life of Test symbol V, which used Steel 15 corresponding to SCr420 described above, be 100. Then, when a specimen exhibited a rupture life of not less than two times the evaluation criterion, that is, not less than 200, the specimen was estimated to have excellent low-cycle fatigue strength.

<D> Roller Pitting Test:

The roller pitting test was conducted by combining a roller pitting small roller specimen having the shape shown in FIG. 6 with a roller pitting large roller having the shape shown in FIG. 7 as shown in FIG. 9 at the following conditions.

The number of tests for the roller pitting test was six, and an S-N diagram in which the ordinate represents the interfacial pressure and the abscissa represents the number of repetitions before the occurrence of pitting was created, and it was assumed that the "pitting resistant strength" be the largest of interfacial pressures at which no pitting occurred before a number of repetitions of $2.0 \times 10^7$.

Furthermore, it was assumed that pitting had occurred when the largest of surface damages which had occurred on the surface of the test portion of the roller pitting small roller had an area of not less than 1 mm².

The test results were normalized by assuming that the pitting resistant strength of Test symbol V, which used Steel 15 corresponding to SCr420 described above, be 100. Then, when a specimen exhibited an pitting resistant strength of not less than 1.20 times the evaluation criterion, that is, not less than 120, the specimen was estimated to have excellent pitting resistant strength.

Slip rate: −40%
Interfacial pressure: 1600 to 3000 MPa
Number of revolutions of small roller specimen: 1500 rpm
Circumferential speed:
    Circumferential speed of large roller specimen V1: 2.86 m/s
    Circumferential speed of small roller specimen V2: 2.04 m/s
Lubricant oil:
    Kind: automatic transmission oil
    Oil temperature: 90° C.
    Amount of oil: 1.0 L/min Moreover, lubrication was conducted by ejecting the above described lubricant oil to the contact portion between the roller pitting smaller roller specimen and the roller pitting large roller specimen.

The above described "slip rate" refers to a value calculated by the following formula.

$$\{(V2-V1)/V2\} \times 100$$

Each test result described above is summarized and shown in Table 6. It is noted that in the "HV after normalization" column of Table 6, only the largest value of measured HV values which were measured on round bars having diameters of 10 mm, 20 mm, and 30 mm for each Test symbol is shown.

TABLE 6

| Test symbol | Steel | HV after normalization | Condition of quenching oil | Intergranular oxidation depth (μm) | Presence or absence of slack quenching structure | High-cycle bending fatigue strength | Low-cycle bending fatigue strength | Pitting resistant strength | Remarks |
|---|---|---|---|---|---|---|---|---|---|
| A | 7 | 144 | *[ii] | 6.8 | #Present | #108 | #160 | #115 | Comparative |
| B | 7 | 144 | *[iii] | 7.2 | #Present | #103 | #140 | #115 | Examples |
| C | 7 | 144 | *[iv] | 7.1 | #Present | #108 | #160 | #115 | |
| D | 10 | 184 | *[iv] | 4.1 | #Present | #108 | #180 | #115 | |

TABLE 6-continued

| Test symbol | Steel | HV after normalization | Condition of quenching oil | Intergranular oxidation depth (μm) | Presence or absence of slack quenching structure | High-cycle bending fatigue strength | Low-cycle bending fatigue strength | Pitting resistant strength | Remarks |
|---|---|---|---|---|---|---|---|---|---|
| E | 12 | 188 | *[iv] | 4.5 | #Present | #108 | #180 | #115 | |
| F | 1 | 160 | [i] | 5.6 | Absent | 116 | 220 | 120 | Inventive |
| G | 2 | 167 | [i] | 4.5 | Absent | 116 | 210 | 120 | Examples |
| H | 3 | 164 | [i] | 4.9 | Absent | 118 | 240 | 120 | |
| I | 4 | 178 | [i] | 4.0 | Absent | 118 | 200 | 120 | |
| J | 5 | 148 | [i] | 6.0 | Absent | 116 | 210 | 120 | |
| K | 6 | 165 | [i] | 3.0 | Absent | 118 | 220 | 120 | |
| L | 7 | 144 | [i] | 6.4 | Absent | 118 | 220 | 120 | |
| M | 8 | 144 | [i] | 5.3 | Absent | 120 | 220 | 120 | |
| N | 9 | 188 | [i] | 2.8 | Absent | 120 | 220 | 120 | |
| O | 10 | 184 | [i] | 3.4 | Absent | 120 | 230 | 120 | |
| P | 11 | 186 | [i] | 5.2 | Absent | 116 | 200 | 120 | |
| Q | 12 | 186 | [i] | 7.6 | Absent | 116 | 200 | 120 | |
| R | 13 | 188 | [i] | 4.1 | Absent | 116 | 220 | 120 | |
| S | 7 | 144 | [i] | — | Absent | 140 | 250 | 120 | |
| T | 7 | 144 | [i] | — | Absent | 140 | 250 | 130 | |
| U | *14 | 150 | [i] | 17.8 | #Present | #86 | #80 | #90 | Comparative |
| V | *15 | 144 | [i] | 10.1 | #Present | ¥100 | ¥100 | ¥100 | Examples |
| W | *16 | 178 | [i] | 11.8 | #Present | #103 | #101 | #110 | |
| X | *17 | 173 | [i] | 10.7 | Absent | 116 | #145 | 120 | |
| Y | *18 | 144 | [i] | 2.1 | Absent | 115 | #155 | 120 | |
| Z | *19 | #210 | [i] | 10.6 | #Present | #108 | #120 | 132 | |
| AA | *20 | 158 | [i] | 3.3 | Absent | #110 | #110 | 130 | |
| AB | *21 | 162 | [i] | 6.9 | Absent | 116 | 200 | #110 | |
| AC | *22 | #218 | [i] | 4.2 | Absent | 116 | 200 | 120 | |
| AD | *23 | 150 | [i] | 3.2 | #Present | #108 | #160 | #115 | |
| AE | *24 | #266 | [i] | 3.7 | Absent | 116 | 220 | 120 | |
| AF | *25 | 148 | [i] | 10.6 | Absent | #110 | #160 | #115 | |
| AG | *26 | 183 | [i] | 3.2 | Absent | #90 | #120 | 120 | |
| AH | *27 | 190 | [i] | 2.2 | Absent | #90 | 200 | 120 | |
| AI | *28 | 165 | [i] | 2.5 | Absent | #90 | #120 | 120 | |
| AJ | *29 | 152 | [i] | 5.9 | Absent | 116 | #120 | 120 | |
| AK | *30 | #220 | [i] | 7.1 | Absent | 120 | 200 | 120 | |
| AL | *31 | #211 | [i] | 6.5 | Absent | 116 | #160 | 120 | |

*mark indicates deviation from the condition specified in the present invention.
¥mark indicates evaluation criterion, and
mark indicates that its target had not been reached.

From Table 6, it is clear that in the case of Test symbols of Inventive Examples which satisfied the conditions specified in the present invention, all of the targeted hardness, microstructure of outer layer portion, high-cycle bending fatigue strength, low-cycle bending fatigue strength, and pitting resistant fatigue strength had been achieved.

In contrast to this, in the case of Test symbols of Comparative Examples which deviated from the conditions specified in the present invention, one or more properties of the targeted hardness, microstructure of outer layer portion, high-cycle bending fatigue strength, low-cycle bending fatigue strength, and pitting resistant fatigue strength had not been achieved.

In the cases of Test symbols A to E, although the chemical compositions of used Steels 7, 10, and 12 were within the range specified in the present invention, the conditions of quenching oil deviated from the condition specified in the present invention, so that the microstructure of outer layer portion, the high-cycle bending fatigue strength, the low-cycle bending fatigue strength, and the pitting resistant fatigue strength had not reached their respective targets.

Moreover, in the cases of Test symbols U to Z and Test symbols of AA to AL, although the conditions of quenching oil were within the range specified in the present invention, all of the chemical compositions of used Steels 14 to 31 deviated from the conditions specified in the present invention. For that reason, one or more properties of the hardness, the microstructure of outer layer portion, the high-cycle bending fatigue strength, the low-cycle bending fatigue strength, and the pitting resistant fatigue strength had not reached their respective targets.

INDUSTRIAL APPLICABILITY

According to the present invention, it is possible to obtain a steel component which has excellent high-cycle bending fatigue strength, low-cycle bending fatigue strength, and pitting resistant strength despite small contents of expensive alloying elements, and furthermore can ensure sufficient machinability in the cutting process or sufficient cold forgeability in the net-shape forming process at the time of production, and in which the variation of heat treatment distortion at the time of carburizing-quenching or carbonitriding-quenching is suppressed.

What is claimed is:
1. A method for producing a steel component by performing the treatments of the following sequentially steps 1 and 2 to a steel material containing, by mass %,
C: 0.15 to 0.25%,
Si: 0.01 to 0.10%,
Mn: 0.50 to 0.80%,
S: 0.003 to 0.030%,
Cr: 0.80 to 1.20%,
Mo: 0.30 to 0.45%,
Al: 0.015 to 0.050%, and
N: 0.010 to 0.025%, wherein fn represented by Formula (1) shown below is 1.3 to 2.4, the balance being Fe and impurities, and contents of P and O among the impurities are P: not more than 0.010%, and
O: not more than 0.0020%:

step 1: a treatment which holds the steel material at a temperature of 850 to 1000° C. in a carburizing atmosphere or carbonitriding atmosphere, and step 2: a treatment which quenches the carburized or carbonitrided steel material, by using quenching oil having a temperature of 40 to 80° C. and a kinetic viscosity of 20 to 25 mm²/s at 40° C.;

$$fn = Cr/Mn \qquad (1)$$

where, Cr and Mn in Formula (1) represent the content of each element in mass %.

2. The method for producing a steel component according to claim 1, wherein the step 1 includes a holding process at a temperature of 850 to 1000° C. in a carburizing atmosphere or carbonitriding atmosphere followed by a holding process at a temperature of 800 to 900° C. in a carburizing atmosphere or carbonitriding atmosphere.

3. The method for producing a steel component according to claim 1, wherein the steel material contains, in mass %, Nb: not more than 0.08% in lieu of a part of Fe.

* * * * *